(No Model.) 2 Sheets—Sheet 1.

H. W. HILL.
FRICTION CLUTCH.

No. 400,212. Patented Mar. 26, 1889.

Witnesses:
Fred A. Vormelker
John L. Doyle

Inventor
Harry W. Hill,
by Watson & Thurston
Attys.

(No Model.) 2 Sheets—Sheet 2.

H. W. HILL.
FRICTION CLUTCH.

No. 400,212. Patented Mar. 26, 1889.

Witnesses
Louis J. Hirt
A. A. Carlisle

Inventor
Harry W. Hill
by Watson + Thurston
Attys

UNITED STATES PATENT OFFICE.

HARRY W. HILL, OF CLEVELAND, OHIO.

FRICTION-CLUTCH.

SPECIFICATION forming part of Letters Patent No. 400,212, dated March 26, 1889.

Application filed October 31, 1887. Serial No. 253,813. (No model.)

*To all whom it may concern:*

Be it known that I, HARRY W. HILL, of Cleveland, in the county of Cuyahoga and State of Ohio, have invented certain new and useful Improvements in Friction-Clutches, of which the following is a full, clear, and exact description, reference being had to the accompanying drawings, in which—

Figure 1:
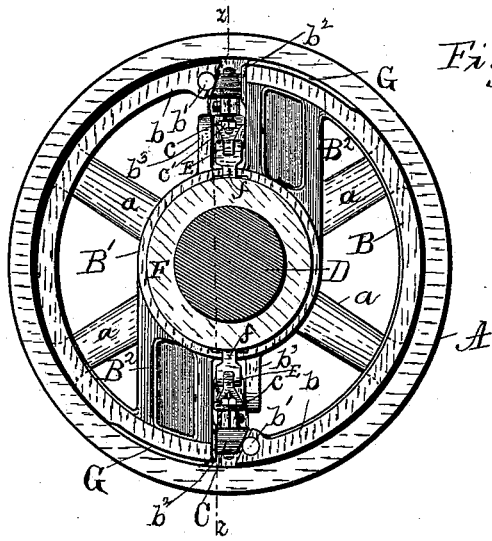
Figure 2:
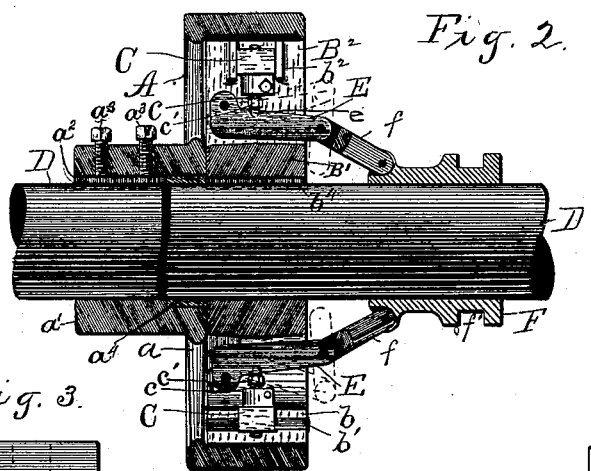
Figure 3:
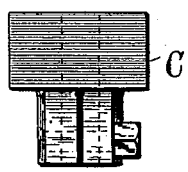
Figure 4:
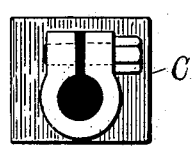
Figure 5:
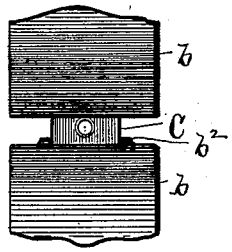
Figure 6:
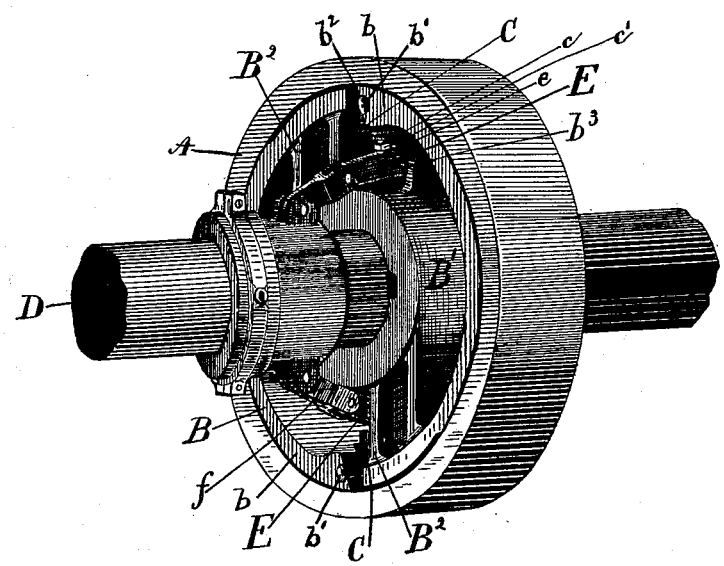

Figure 1 is a side elevation of my improved clutch. Fig. 2 is a sectional view on the line 2 2 of Fig. 1. Fig. 3 is a front view of one of the expanding-blocks. Fig. 4 is a bottom view thereof, and Fig. 5 is an edge view of a part of the male member at one point where the two semi-rings are nearest. Fig. 6 is a perspective view of my improved clutch.

Like letters represent the same parts in the several figures.

My invention is in the nature of a modification of and improvement upon the clutch which is described in Letters Patent No. 374,834, granted me December 13, 1887, the object being to provide a clutch adapted to be made of larger size than is practical with the clutch shown in said patent.

To this end it consists in the construction and combination of parts herein described, and pointed out definitely in the claims.

Referring to the parts by letters, A represents the overhanging clutch-rim, which is mounted on the shaft D through the instrumentality of arms $a$ and hub $a'$, from which said arms radiate, or other equivalent means.

The particular means shown whereby the hub $a'$ is to be secured to the shaft D consist of loose key $a^2$, which is inserted in suitable key-seats in the shaft D and hub $a'$, respectively, where it is held while the device is in operation by set-screws $a^3\ a^3$. The outer periphery of this rim may in the form shown serve as a band-pulley; or the rim may be rigidly secured to the arms or hub of a pulley in the well-known manner.

B represents an expansion-band, which consists of two semi-rings, $b\ b$, each connected at one end to one of the two arms $B^2\ B^2$, which are secured to the hub $B'$ on opposite sides of the center thereof, said hub being mounted upon and secured to the shaft $D'$ by means of a key, $b^4$, which is driven into suitable key-seats in the shaft $D'$ and hub $B'$, respectively. The semi-rings, arms, and hub are made integral with each other and form the male clutch member, and the arms are made of such size as to be substantially inflexible. This expansion-band is arranged within the clutch-rim A, and is a trifle smaller than said rim, whereby it may, when in its normal position, turn freely within said rim. The free ends of said semi-rings are preferably provided with the friction-pins $b'$, which are partly embedded in said ends, as shown, so that the wedges C bear against said pins and not against the said ends direct, thereby greatly lessening the friction, which construction is described and claimed in my said patent, No. 374,834.

The rings are sprung outward, so as engage with the clutch-rim by radially-moving wedges, or, more properly, inclined blocks C, which are forced between each arm $B^2$ and the proximate free end of one of the semi-rings $b$. As the arms are rigid that side of the blocks C which bears against said arms, and that part of said arms against which said blocks bear, are finished to lie parallel to the radial lines in which said blocks move. The opposite sides of said blocks, which bear against the free ends of the semi-rings, are inclined or wedge-shaped, as shown.

On the arms $B^2\ B^2$ are the guide-lugs $b^2\ b^2$, between which the blocks C move, and which prevent their lateral displacement. An arm, $c$, adjustable in length, is secured at one end to each block C, and the inner end of said arm is engaged with an operating-lever, E. The arm $c$ is in the form of an adjusting-screw, one end of which screws into its block, the other end being seated in a suitable socket, $e$, in the lever E. Between its ends each screw is provided with a head, $c'$, to which a wrench may be applied to screw it into or out of its block, and thereby decrease or increase the effect of said block in expanding the semi-ring which it operates.

Each of the levers E is pivoted to an arm, $B^2$, and an ear, $b^3$, which is rigidly secured to or made integral with the hub $B'$, and their outer ends may be forced outward to expand the two parts of the band B by any of the well-known means. The means shown consists of a loose sleeve mounted on the shaft, links $f$, pivoted to said levers, and ears on said sleeve, and a shifting-lever, which engages with said sleeve in the groove $f'$ thereof.

The mechanism above described is shown in the drawings in use as a shaft-coupling, and when so used it is preferable to secure the hub $a'$ to the shaft D by the loose key $a^2$, as above described, so that the connection can be easily loosened, and when so used it is well to insert a bushing, $a^4$, in that end of the hub which surrounds the end of the shaft D' for the purpose of steadying it. I do not, however, wish to be understood as considering the herein-described means for securing either of the hubs B' or $a'$ to their shafts as material to the invention. They may be so secured in any desired manner.

The operation of the above-described device is as follows: The sleeve F is shifted toward the hub B'. This throws out the lever E, as shown by the dotted lines in Fig. 2, thereby forcing the blocks outward and expanding the semi-rings $b$ $b$ and forcing them against the rim A, and causing it to partake of their motion. The movement of the blocks C and their arms is, by reason of the rigidity of the arms $B^2$ $B^2$ and the direction in which the meeting faces of said arms and blocks lie, always in a radial line, which prevents any side strain on the arms $c$, whereby the power from the lever E is transmitted in a straight line with the minimum loss to expand the semi-rings $b$ $b$.

In order to give the necessary clearance between the rim and the male clutch member—that is to say, the hub, arms, and semi-rings—when not expanded, and at the same time to give sufficient friction-surface between them when said rings are expanded, the periphery of said member is finished as follows: It is cast with a depression, G, in the periphery of each semi-ring from the point where it unites with its arm back for about one-sixth of its length. This gives the necessary clearance at the point where said rings are substantially rigid. The semi-rings are then sprung outward to an extent varying slightly with the speed at which it is designed to run, and are then turned down until the diameter is equal to the inner diameter of the clutch-rim. When the expanding-blocks are removed and the semi-rings assume their normal position, the periphery of the male member is in the form of a double eccentric. Sufficient clearance is thereby provided between the clutch-rim A and said male member, even when the free ends of the semi-rings are thrown outward by the centrifugal force, while, when the rings are purposely sprung out, almost their entire periphery is in contact with the inner surface of the clutch-rim.

The above manner of finishing the periphery of the male member is not the only way in which this style of clutch may be made operative, but it is the best way in my opinion; and although I claim this as a part of my invention, I do not wish to limit the other parts of my invention, to a male clutch-member having its periphery finished in this or in any other particular manner.

Having now described my invention, what I claim as new, and desire to secure by Letters Patent, is—

1. The combination of the following integral parts, to wit: a hub, two arms united therewith on opposite sides of the center, and two semi-rings, each united at one end to one of said arms, with a clutch-rim and radially-moving blocks, inclined on one side and straight on the other, for expanding said semi-rings, substantially as and for the purpose specified.

2. The combination of a hub, two arms united therewith on opposite sides of the center, and two semi-rings, each united at one end with one of said arms, with a clutch-rim and radially-moving blocks inclined on the side which engages with the free end of one semi-ring, the other side and the face of the arm against which it bears being parallel to the axial line in which it moves, substantially as and for the purpose specified.

3. In a friction-clutch, the combination of a hub, two arms united therewith on opposite sides of the center, and two expansion semi-rings, each secured at one end to one of said arms, with a clutch-rim, A, radially-moving blocks C of the form described, the lugs $b^2$, and levers for moving said blocks, substantially as and for the purpose specified.

4. In a friction-clutch, the combination of a hub, two arms united therewith on opposite sides of the center, and two expansion semi-rings, each secured at one end to one of said arms, with a clutch-rim, A, radially-moving blocks C of the form described, the lugs $b^2$, levers for moving said blocks, and adjustable screws connecting said blocks and levers.

5. In a friction-clutch, a male clutch member consisting of a hub, two arms united therewith on opposite sides of the center, and two semi-rings, each united at one end with one of said arms, the whole being cast in a single piece, for the purpose specified.

6. In a friction-clutch, a male clutch member consisting of a hub, two arms connected therewith on opposite sides of the center, and two semi-rings, each connected at one end to one of said arms, the periphery of each of said rings being depressed at and near the point of union with said arms, the whole being cast in a single piece, substantially as and for the purpose specified.

7. In a friction-clutch, a male clutch member consisting of the following integral parts, to wit: a hub, two arms united therewith on opposite sides of the center, and two semi-rings, each united at one end to one of said arms, the periphery of each of said semi-rings being depressed at and near its point of union with its arm, and the periphery of said clutch member being made in the form of a double eccentric, substantially as and for the purpose specified.

HARRY W. HILL.

Witnesses:
E. L. THURSTON,
FRED W. VORMELKER.